United States Patent Office 3,436,926
Patented Apr. 8, 1969

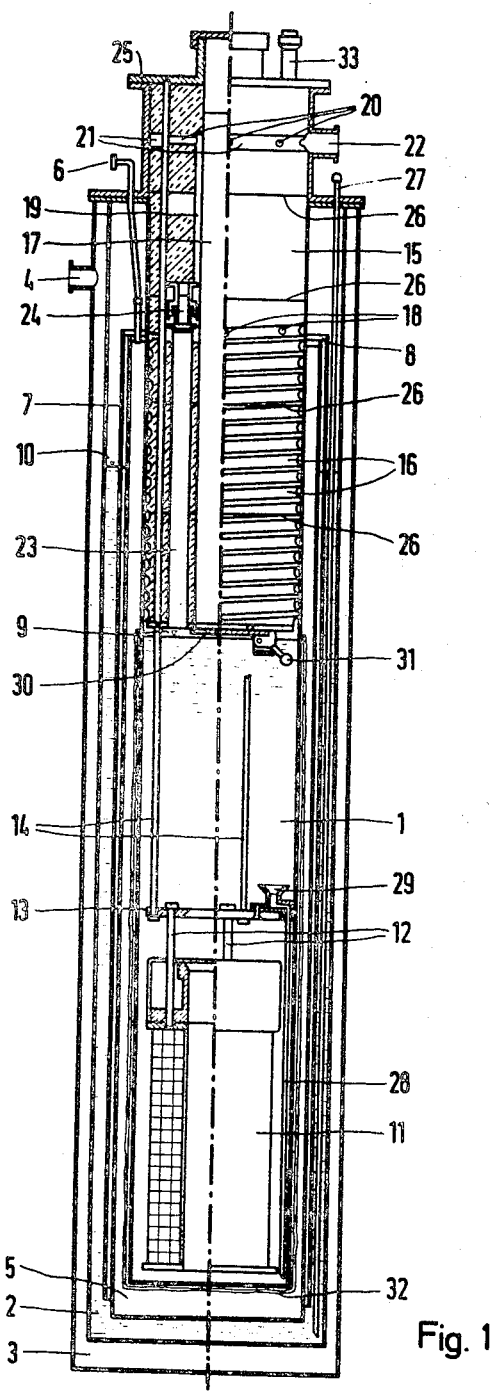
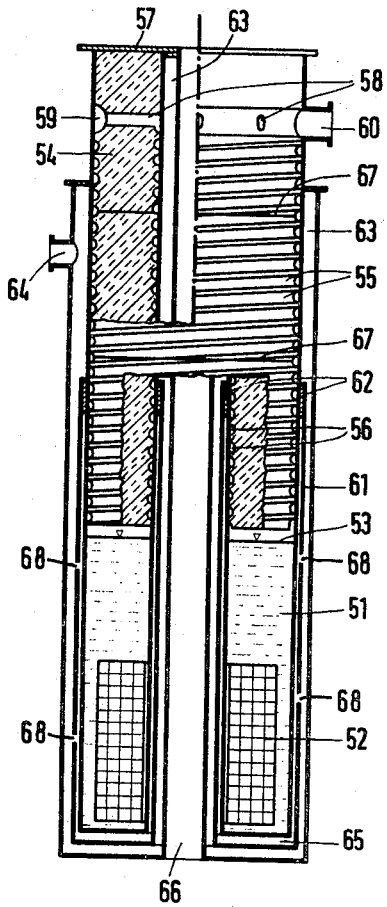
Fig. 1
Fig. 3

3,436,926
REFRIGERATING STRUCTURE FOR CRYOSTATS
Günther Bogner, Erlangen, and Helmut Marsing, Hetzles (Lower Rhine), Germany, assignors to Siemens Aktiengesellschaft, a corporation of Germany
Filed Mar. 15, 1967, Ser. No. 623,461
Claims priority, application Germany, Mar. 22, 1966, S 102,653
Int. Cl. F17c 7/02, 9/02
U.S. Cl. 62—45   7 Claims

ABSTRACT OF THE DISCLOSURE

A cryostat having a container provided with a lower interior portion which houses an electrical superconductive structure. A refrigeration liquid of low boiling point is located in the lower portion of the container and extends up to a given elevation therein, and above this latter elevation the container has an inner surface. A displacer body of low thermal conductivity is situated within and substantially fills the container down to the region of the latter elevation up to which the liquid refrigerant extends, and this displacer body has an outer surface directed toward the inner surface of the container and formed with a helically rising groove along which vaporized refrigerating liquid flows, the groove having a cross section sufficiently great to prevent any substantial increase in the pressure within the container beyond that which is provided during normal operation of the cryostat.

Specification

Our invention relates to cryostats.

In particular, our invention relates to cryostats which are provided with a liquid refrigerating medium of low boiling point, especially for refrigerating superconductive structures such as superconductive coils.

With known cryostats which are provided with a liquid refrigerating medium of low boiling point, used for example, for refrigerating measuring specimens, super conductive coils, or other superconductive structures, the structure which is to be refrigerated is immersed within a liquid refrigerant situated within a container therefor, this liquid refrigerant preferably being liquid helium. The container for the liquid refrigerant is surrounded by one or more evacuated jackets for the purpose of heat insulation, and it may also be surrounded by a further container which serves as a radiation shield and which contains a refrigerating liquid of a higher boiling point than that which is situated in the container which houses the superconductive structure, this liquid of higher boiling point, being, in particular, liquid nitrogen.

During operation of a known cryostat of this type, the refrigerating liquid of the lower boiling point which is situated in the container which houses the superconductive apparatus vaporizes in the latter container, and this vaporized refrigerating liquid rises freely in the known cryostat in to the space within the container over the refrigerating liquid therein, and this vaporized refrigerating liquid flows out of the container and may be directed to an installation for recovering the refrigerating liquid. As a result, the refrigerating capacity of the refrigerating medium, and in particular of the vaporized refrigerating medium is utilized only to a small extent. This latter factor is particularly disadvantageous, when taking into consideration the continuous operation of the cryostat since it is best to maintain the consumption of refrigerating medium as small as possible and thus to achieve the greatest possible use of the refrigerating capacity of the refrigerating medium.

During operation of superconductive installations, particularly those which have superconductive coils, it is only practical to use liquid helium as the refrigerating medium because of the low critical temperature of the superconductive materials, this temperature being below approximately 18° K., and because of the deterioration of the magnetic properties of the superconductor as the temperature rises. Inasmuch as liquid helium is relatively expensive, it is important to maintain the consumption of the refrigerating medium as low as possible in order to achieve an operation for the installation which is economically feasible, particularly in the case of installations which include superconductive coils.

It is accordingly a primary object of our invention to provide a cryostat which is capable of maintaining the consumption of the refrigerating liquid as low as possible.

In particular, it is an object of our invention to provide a cryostat which will utilize the refrigerating capacity of the vaporized refrigerating medium to an extent far greater than in conventional cryostats.

It is also an object of our invention to provide a structure which can accomplish this result in cryostats of different types wherein, for example, a superconductive coil is arranged vertically or horizontally and wherein the center of the coil is closed off from the outer atmosphere or is readily accessible.

The above objects are achieved with our invention primarily by providing, in a cryostat, a container means for containing in a lower portion thereof a refrigerating liquid of low boiling point which extends in the container means up to a given elevation therein, the container means having an inner surface extending upwardly from the latter elevation. In accordance with our invention a passage means is situated in the container means and coacts with the latter inner surface thereof for directing vaporized refrigerating liquid upwardly along the latter inner surface of the container means. A displacer body is situated in this container means and substantially fills the latter down to the region of the latter elevation up to which the liquid refrigerant extends, and this displaced body has an outer surface which is grooved so as to form this passage means. This outer surface of the displacer body is formed with a helically rising groove along the interior of which the vaporized refrigerating liquid flows to engage the inner surface of the container means and thus cool the wall thereof. The cross section of the groove in the outer surface of the displacer body is made large enough so that it is capable of handling an amount of vaporized refrigerating liquid which is encountered under normal operating conditions without providing any appreciable increase in the pressure within the container means.

As a result of this passage means of our invention which is formed by the grooved exterior surface of the displacer body, the vaporized refrigerating medium is directed slowly upwardly along and in intimate contact with the wall of the container in the interior thereof. This wall of the container for the refrigerating medium is therefore precooled in an outstanding manner above the level of the liquid refrigerating medium therein. Thus, with cryostats of our invention, there is the advantage of a simple liquid refrigeration for the structure which is to be refrigerated, particularly for a superconductive coil combined with the advantage of vapor-cooling of the container wall.

In order that the refrigerating capacity of the vaporized refrigerating medium be utilized to the fullest possible extent for the cooling of the wall of the container, the displacer body is advantageously made of a material of low thermal conductivity having a small heat capacity.

A particularly suitable material for this purpose is a foam material, especially a known plastic foam which is sold under the trade name Styrofoam. This foam material has a poor thermal conductivity and has only a small heat capacity. Moreover, it is of a very low weight, so that the mechanical structure of the cryostat remains practically unstressed by the displacer body.

In order to avoid an additional rising of the vaporized refrigerating medium through the pores of the foam material of the displacer body, it is of advantage to use a displacer body whose exterior surface has the foam pores thereof closed for the most part, so that in this way while the vapor cannot pass through the displacer body there is nevertheless a pressure compensation which takes place during cooling as a result of the entrance of the vaporized refrigerant into the interior of the displacer body. In this way a shrinking of the displacer body during lowering of the temperature thereof is avoided. For example, where the displacer body is of a cylindrical configuration, the pores at the side and upper end surfaces of the body can be closed, while at the lower end surface of the displacer body some of the pores remain open. When using a Styrofoam displacer body, the pores at the exterior surface can, for example, be closed by providing a glaze at the exterior surface of the body through suitable heat treatment thereof.

It is also possible to prevent the flow of the gas through the pores of the foam displacer body by covering the latter with a plastic foil which is itself coated with a thin metallic layer to avoid thermal radiation. For example, a thin plastic foil which is coated with aluminum and which is known under the trade name Hostaphan can be used. In the region of the helically grooved outer surface of the displacer body, this foil is advantageously crumpled or crimped to some extent so as to increase the roughness of its exterior surface, and in this way the flow of vapor is renderd turbulent so that the extent of heat exchange between the vaporized refrigerating medium and the container wall is increased.

In order to present radiation of heat into the cryostat through a cryostat cover which is situated over the displacer body, there is provided in a preferred embodiment of a cryostat according to our invention, a displacer body which is transversely divided, in a direction perpendicular to its longitudinal axis, into a plurality of body portions. Thin metallic sheets or metal foils are respec- the displacer body, and because of the refrigeration detively arranged between these individual portions of rived from the upwardly flowing vaporized refrigerating liquid, these metal sheets or foils are respectively at different temperatures and thus serve as radiation shields. For example, metal sheets which have been improved at their exterior surfaces, in particular chromed or gold-plated copper sheets having a thickness of from approximately 0.5 to 1 mm. have proved to be suitable.

In order to increase the reliability of the operation of the structure, particularly in the case where the cryostat is providid with a superconductive coil which is to be refrigerated, it is of advantage to provide in the displacer body, for the purpose of limiting the pressure in the container, a second path of flow for the vaporized refrigerant, this second path of flow forming a second passage means and being provided with a pressure relief valve which is closed during normal operating conditions. Because of the presence of this second passage means, the amount of vapor which, for example, is encountered during the operation as the result of vaporizing of part of the liquid refrigerant when the superconductive coil undergoes a transition into the normal state, can be conducted out of the cryostat without any substantial increase in the pressure within the refrigerant container and thus without any damaging of the cryostat. On the other hand, the substantially smaller amount of vapor which is provided during normal operating conditions flows, with the pressure relief valve remaining closed, through the grooves of the displacer body along the wall of the refrigerant container.

In cryostats which house superconductive coils which are refrigerated, the electrical leads which are required to enter the cryostat to supply these coils with electricity form a source of additional substantial heat entry into the interior of the refrigerant container which can be controlled only with great technical difficulty. In particular, in the case of superconductive coils which are wound from superconductors in the form of cables, the current leads have a relatively large cross section. These leads, can, for example, be directed from the cover of the cryostat through bores formed in the displacer body to the lower portion of the refrigerant container where the coil is located. It is of particular advantage, however, in accordance with our invention, to direct these leads for the superconductive coil through the grooves of the displacer body. The current-conducting leads which are thus arranged in these grooves, and which may be provided with cooling fins, are cooled in an outstanding manner by the refrigerant vapor which flows upwardly along the interior of the grooves. Conduction of heat by way of the current conductors into the interior of the cryostat can in this way be avoided to a very large extent. The cross section of the grooves is selected in such a way that in spite of the presence of the current conductors in the grooves a flow of the amount of vapor which is encountered during normal operating conditions through the grooves is assured.

The principles used in the construction of a cryostat according to our invention can be applied to cryostat structures of the most widely varying forms. For example, the displacer body can be used in cryostats for superconductive coils where the interior space of the coil itself is situated in the liquid refrigerating medium during operation of the cryostat, or the structure of our invention can also be used with cryostats for superconductive coils having vertically or horizontally arranged interior spaces which are accessible from the exterior during operation of the cryostat.

According to one embodiment of a cryostat of our invention where the superconductive coil has a vertically arranged interior space which is accessible from the exterior, the container for the liquid refrigerating medium has the form of a hollow cylinder provided with inner and outer cylindrical walls between which the displacer body is situated. In this case the displacer body is formed with grooves at both of its surfaces which are respectively directed toward both of the cylindrical walls of the container. Thus, with this construction the passage means of our invention will direct the vaporized refrigerating liquid along both of these walls of the container. Thus, by this special construction of the displacer body, a uniform cooling of the outer as well as the inner wall of the container is achieved.

According to a further embodiment of a cryostat according to our invention, which is particularly suited for superconductive coils having an inner space which is situated in the liquid refrigerating medium during operation, the refrigerant container is at least partly surrounded by a container for a liquid refrigerating medium of a higher boiling point, and between both of these containers a means which provides an evacuated space is situated, this latter space being evacuated separately from the remaining vacuum system of the cryostat. As a result of this latter separately evacuated space which may, for example, be filled with nitrogen gas, particular advantages are achieved when producing the required refrigeration upon initiation of the operation of the cryostat. In particular, it is unnecessary to fill the container for the refrigerating liquid of a lower boiling point with a refrigerating liquid of a higher boiling point for the purpose of precooling the container, and the great difficulties encountered in the essential complete separation of the liquid refrigerant of higher boiling point before filling with the liquid of lower boiling point are eliminated.

According to a further embodiment of a cryostat according to our invention, the refrigerant container is surrounded by a heat shield of a metal of good thermal conductivity, and this heat shield is connected with the wall of the refrigerant container at the elevation of the displacer body so that it is cooled by the refrigerant vapor. With this construction it is unnecessary to provide an additional container for a refrigerating liquid of higher boiling point for the purpose of protecting against radiation. Cryostats with vapor-cooled heat shields are suitable, therefore, particularly for use in the case where there is but little space available for the radiation shield and vacuum jacket which surround the refrigerant container, such as, for example, in the case where it is required to refrigerate a superconductive coil having an interior space which is accessible from the exterior.

In order to prevent the formation of ice at the cover of the cryostat during operation thereof, the passage means formed by the exterior grooved surface of the displacer body and also in certain cases within the displacer body is situated in such a way that the vaporized refrigerating medium is directed along a path which is spaced from the cover of the cryostat so that the cover is not engaged by the vaporized refrigerating medium.

Our invention is illustrated by way of example in the accompanying drawings which form part of this application and in which:

FIG. 1 is a schematic sectional elevation of one possible embodiment of a cryostat according to our invention;

Figure 4:
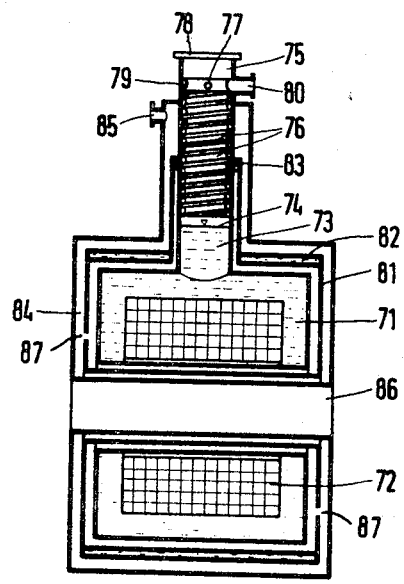

FIG. 3 is a schematic sectional elevation of an embodiment of a cryostat of our invention used for refrigerating a superconductive coil having vertically arranged interior space which is accessible from the exterior; and FIG. 4 is a schematic sectional elevation of an embodiment of a cryostat according to our invention which is used for refrigerating a superconductive coil having a horizontally arranged interior space which is accessible from the exterior.

Referring to FIG. 1, the cryostat illustrated therein is used for refrigerating a superconductive coil whose interior space is filled with liquid helium during operation of the cryostat. The cooling medium of low boiling point, namely helium, is situated in a lower portion of the container means 1. The refrigerant container 1 is surrounded by a double-walled container 2 with serves as a protection against radiation, and the container means 2 contains a liquid refrigerating medium of a higher boiling point, namely liquid nitrogen. An outer vacuum jacket 3, which is capable of being evacuated through the pipe 4, surrounds both of the containers 1 and 2. Between the helium container 1 and the nitrogen container 2 there is a means which provides an evacuated space 5, and this latter space is maintained separate from the remaining vacuum system of the cryostat and is capable of being evacuated through the pipe 6 or is capable of being filled with a gas. The containers 1 and 2 and the walls of the vacuum jacket 3 are advantageously made of $V_2A$-steel. The wall thickness of the helium container 1 is made so thin that, taking into consideration the possible action of the pressure, there is a minimum possible introduction of heat into the liquid helium which is situated in the lower portion of the container. The evacuated space 5 which surrounds the container 1 is enclosed by a heat shield 7 made of copper, and this heat shield 7 extends into the liquid nitrogen which is situated in the container 2. At its upper end 8, the heat shield 7 is in heat-conductive connection with the wall of the helium container 1 and thus cools the container wall at this location approximately to the temperature of liquid nitrogen, which is to say approximately to 78° K.

During operation the helium in the container 1 has its upper surface 9 situated at the elevation shown in FIG. 1, while the liquid nitrogen in the container 2 has an upper surface 10 at a higher elevation. The superconductive coil 11 is situated within the lower interior portion of the helium container 1 and is immersed during operation deeply into the liquid helium.

The superconductive coil is supported through holding rods 12 made of a material of poor heat conductivity from a carrier plate 13 which is made, for example, of a hard plastic. This carrier plate 13 is in turn supported by way of holding rods 14 of poor thermal conductivity from the cover 25 of the cryostat.

Situated in an upper portion of the helium container 1, and filling the latter down to the region of the elevation of the upper surface 9 of the helium, is the displacer body 15 which is made of the foam material. The lower portion of the displacer body 15 is provided at its outer surface with the passage means of our invention in the form of a helically rising groove 16 along the interior of which the vaporized refrigerating medium encountered during operation is guided along the wall of the container 1.

A pipe 17 extends through the displacer body, so as to make it possible, before the cryostat is set into operation, to have access to the inner space of the super-conductive coil 11. The grooves 16 are directed upwardly along the displacer body 15 approximately to the elevation of the upper end 8 of the heat shield 7 where this upper end is connected with the wall of the container 1. The enthalpy of the helium vapor is therefore used, with this construction of a cryostat according to our invention, to a very large extent to cool the wall of the helium container in a temperature range of between 4.2° and 78° K. at the elevation of the end 8 of the heat shield 7. The helium vapor is directed through radially extending bores 18 which are formed in the displacer body 15 into a tubular chamber 19 which surrounds the pipe 17. In this way refrigerating of the pipe 17 by way of the helium vapor is also achieved. The helium vapor which rises upwardly through the chamber 19 is directed through radial bores 20 formed in the displacer body into an annular chamber 21 which communicates with a pipe 22. Through this pipe the helium vapor can be continuously discharged and, if desired, can be directed to an installation for recovering helium.

The above-described passage means for the helium vapor is arranged in such a way that the helium vapor does not contact the cryostat cover 25.

In order to provide assurance against excessive pressure in the helium container 1, which might, for example, be encountered when the superconductive coil 11 undergoes a transition into the normal state, a second passage means is formed in the displaced body 15, and this second passage means takes the form of a vertically extending bore 23 which is open at its bottom end and which leads to a pressure relief valve 24. In this way the pressure within the container is limited. Any helium vapor which flows through the pressure relief valve 24 is received in the chamber 19 and is directed through the bores 20 and chamber 21 to the pipe 22.

The displacer body 15 is divided, perpendicularly to its longitudinal axis, into a plurality of body portions. Between these individual body portions are situated thin, gold-plated copper sheets 26 for the purpose of screening the cryostat cover 25 from heat radiation.

In order to fill the nitrogen container 2, which acts as a radiation shield, a filling tube 27 is provided, this tube preferably being made of German silver and extending down to the bottom of the container 2 so as to assure a smooth, unturbulent filling of the container 2. The tube 27 terminates just above the bottom wall of the container 2.

In order to fill the helium container 1 with liquid helium, a tube 28 is provided, and this tube also is preferably made of German silver and extends almost down to the bottom wall of the container 1. The upper end of the tube 28 communicates with a funnel 29 which is fixed to the carrier plate 13. A helium syphon can be introduced into the funnel from the cryostat cover 25 along the interior of the cryostat. For the purpose of accommodating this syphon, the interior of the displacer body 15 is provided with a suitable bore.

The pipe 17 is closed at its bottom end by means of a metal plate 30 which is fixed to a pivotally supported weight 31 which automatically maintains the closure plate 30 in its closed position. Any downward force acting on the plate 30 will swing it to its open position in opposition to the force of the weight 31 which will automatically return the plate 30 to its closed position, when the plate 30 is released. As a result of this plate 30, rising of helium vapor along the interior of the pipe 17 during operation of the cryostat is avoided.

In order to provide additional shielding against heat radiation, the part of the helium container 1 in which the liquid helium is situated is surrounded by a plurality of thin plastic foils 32 which are each provided with a thin aluminum coating, so that in this way a so-called super-insulation is achieved.

A connection to a source of current for the coil 11 is provided by way of a plug 33 which is situated at the cryostat cover.

Figure 2:
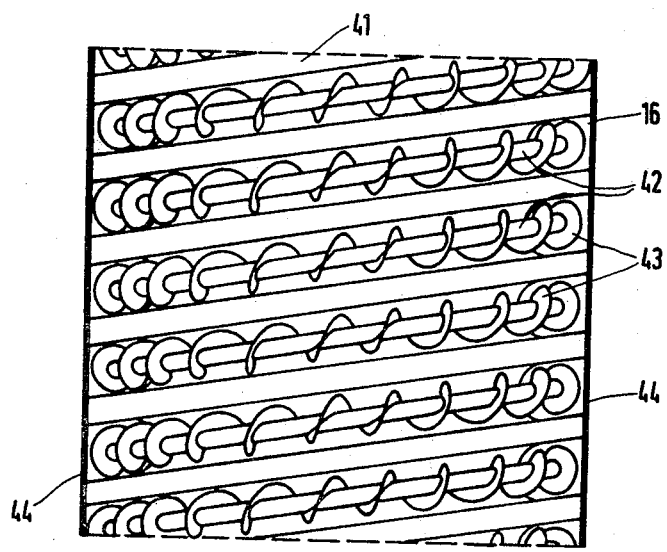
FIG. 2 shows a portion of the displacer body of FIG. 1 with current conductors situated in the grooves thereof.

The current-conducting leads for the coil 11 are not shown in FIG. 1 for the sake of clarity. They are advantageously housed within the grooves 16 of the displacer body 15. A portion of the displacer body with the current leads situated in the grooves thereof is shown in a plan view in FIG. 2. Thus, FIG. 2 shows the leads 42 situated within the grooves 16. In this embodiment the leads are provided with cooling fins 43 of spiral-shaped configuration. Furthermore, it is apparent from FIG. 2 that the ribs 41 which are formed in the spacer body between the grooves 16 thereof are situated fluid-tightly against the wall 44 of the helium container, so that a good guiding of the helium vapor in the grooves is assured.

With the cryostat of FIG. 1, where the displacer body 15 is provided with the helical grooves only in its lower portion, the current leads can, for example extend from the plug 33 through an unillustrated bore into the annular chamber 21, from the latter through a pair of the radially extending bores 20 into the tubular chamber 19, and from the latter through a pair of the radially extending bores 18 into the grooves 16 of the displacer body 15. In the lower portion of the helium container 1 the current leads are then freely directed through the helium to the coil 11.

The separation of the evacuated chamber 5 with the cryostat of FIG. 1 from the remaining vacuum system of the cryostat provides, as already pointed out, during initiation of the operation of the cryostat, special advantages. Thus, after evacuating the remainder of the cryostat, the nitrogen container 2 can initially be filled with nitrogen and then through the pipe 6 a suitable heat-exchanging gas, for example gaseous nitrogen, is directed into the space 5 which is capable of being evacuated. As a result, the helium container 1 is quickly refrigerated down to the temperature of the liquid nitrogen, without requiring, as in the case of conventional cryostats, that the container 1 be filled with liquid nitrogen. Before the container 1 is filled with helium, the heat-exchanging gas is evacuated out of the space 5 through the pipe 6.

FIG. 3 shows an embodiment of a cryostat according to our invention in a schematic manner and in section, this embodiment being designed for refrigerating a superconductive coil having a vertically arranged interior space which is accessible during the operation from the exterior. The helium container 51, in whose interior lower portion the superconductive coil 52 is situated, has the configuration of a hollow cylinder provided with inner and outer coaxial cylindrical walls. Above the surface 53 of the helium there is in the container 51 a displacer body 54 which also has the form of a hollow cylinder and which is situated between the inner and outer walls of the container 51. This displacer body 54 is formed at its outer cylindrical surface with the helical grooves 55 which are directed toward the outer cylinder wall of the container and at its inner cylindrical surface with helical grooves 56 which are directed toward the inner cylindrical wall of the container 51. These grooves 55 and 56 thus form the passage means of this embodiment which serves to direct the refrigerant vapor along the inner and outer walls of the cylindrical helium container 51, and in this way a precooling of these walls of the helium container with helium vapor is made possible. The helium vapor which rises upwardly through the grooves 56 is directed through radial bores 58, formed in the displacer body below the cryostat cover 57, into the annular chamber 59. The grooves 55 communicate directly with the annular chamber 59. This chamber communicates with a pipe 60 through which the helium vapor is discharged, and in this case, also if desired, the discharged helium vapor may be directed to an installation for recovering the helium.

The lower portion of the helium container 51 is surrounded by a heat shield 61 which is also of a hollowed out cylindrical configuration, in that it has both inner and outer coaxial cylindrical walls, and this heat shield 61 is made of a metal of good thermal conductivity, preferably copper. At the elevation of the displacer body 54, the heat shield 61 is connected with the wall of the helium container 51 by copper rings 62. In this way, with this embodiment of our invention the helium vapor which rises upwardly through the grooves 55 and 56 of the displacer body is used not only for cooling the wall of the helium container but also for cooling the heat shield 61. A nitrogen container to be used as a radiation shield is not required with this construction. Of course, the cryostat of our invention can be provided, when used with a superconductive coil having a freely accessible interior space, also with an additional nitrogen container serving as a heat shield.

For the purpose of providing further heat insulation, there is situated around the helium container 51 and the heat shield 61 a vacuum jacket 63 capable of being evacuated through the pipe 64. The space 65 between the helium container 51 and the heat shield 61 is in communication with the chamber 63 through small openings 68 formed in the heat shield 61, so that in this way this space 65 can also be evacuated in a simple manner.

The displacer body 54 can also be provided, in a manner similar to the embodiment of FIG. 1, with a second passage means for the vaporized refrigerating liquid, this second passage means also being provided with a safety valve for limiting the pressure in the helium container 51. Also, the coil supporting structure and the current conductors leading to and from the coil can be constructed in a manner similar to that described above in connection with FIGS. 1 and 2.

Through the pipe 66 which extends throughout the entire cyrostat from the top to the bottom thereof and which is open at both of its ends, the interior space of the coil 52 is freely accessible even during operation of the cryostat.

In this embodiment also the displacer body 54 is divided perpendicularly to its longitudinal axis into a plurality of body portions which are maintained separate from each other by the sheets 67 which act as heat shields.

FIG. 4 shows in section and in a highly simplified manner an embodiment of a cryostat according to our invention used for refrigerating a superconductive coil having a horizontally situated interior space which is freely accessible from the exterior during operation. The refrigerant container for the liquid helium is made in this case from a part 71 of hollowed out cylindrical walls whose common axis is horizontal, and the outer cylindrical wall of this part of the container, which houses the superconductive coil 72, is fixed to a vertically extending tower-shaped structure 73 in the form of a tube or hollow column whose interior space communicates with the interior space of the part 71 of the refrigerant container. In this tower-shaped part 73 of the refrigerant container there is situated over the surface 74 of the helium a displacer body 75 which is also divided perpendicularly with respect to its longitudinal axis into a plurality of body portions which are separated from each other by copper sheets. This displacer body 75 thus extends downwardly into the interior of the container 71, 73 to the region of the elevation of the surface 74 of the liquid helium, and it is formed at its exterior surface with helically rising grooves 76 which serve to direct the helium vapor along the wall of the helium container. In the interior of the displacer body there is, in a manner similar to the construction of FIG. 1, an unillustrated second passage means for the vapor, this second passage means also being provided with a safety valve. Any helium vapor which happens to flow through the safety valve can flow from the latter through radially extending bores 77 of the displacer body 75, these bores being arranged beneath the cryostat cover 78, into an annular chamber 79 which communicates with the discharge pipe 80. The exterior grooves 76 of the displacer body also communicate with the annular chamber 79. Thus, the helium vapor can be discharged out of the cryostat through the pipe 80.

The helium container is surrounded by a radiation shield 81 made in part of a nitrogen container 82 having inner and outer coaxial cylindrical walls and the remainder of which is made, for the purpose of saving space, from copper sheet, this copper sheet being in good thermal conductive relationship with the nitrogen container. The radiation shield 81 is fixed at its upper portion 83 to the tower-shaped structure 73 of the helium container and is carried by the latter. The helium container and the radiation shield are surrounded by a vacuum jacket 84 capable of being evacuated by way of a pipe 85. The space between the radiation shield and the helium container communicates through small openings 87 formed in the radiation shield with the vacuum chamber 84 so that in this way this latter space can be easily evacuated.

The current leads for the superconductive coil 72 can be arranged in the grooves of the displacer body in a manner similar to that described above and shown in FIGS. 1 and 2. For this purpose suitable bores are formed in the upper part of the displacer body 75. In addition, the displacer body 75 is provided with passages through which helium can be filled into the helium container. The superconductive coil 72 can advantageously be fixed to the wall of the cylindrically shaped part 71 of the helium container. By way of the pipe 86 which is open at both of its ends, the interior space of the coil 72 is freely accessible during operation.

In addition to being used for refrigerating superconductive coils, the cryostats of our invention can also be used for refrigerating other superconductive structures or for refrigerating different types of measuring specimens which are required to be refrigerated down to extremely low temperatures for measuring purposes. In particular, for certain measuring purposes, it is possible to use instead of liquid helium other liquid refrigerants having temperatures corresponding to the required temperatures, such as, for example, liquid hydrogen or liquid nitrogen as a refrigerating medium.

We claim:

1. A cryostat comprising container means for containing a refrigerant of low boiling point in a lower portion of said container means up to a given elevation therein, said container means having an inner, substantially cylindrical surface extending upwardly from said given elevation, and a displacer body located in said container means and extending down to the region of said given elevation, said displacer body consisting entirely of heat insulating material and having an outer surface peripherally contacting said inner surface of said container means and provided with a helically rising groove to form a passage for channeling vaporized refrigerant upwardly therealong in an amount resulting from normal operating conditions without substantially increasing the pressure in said container, said displacer body being further provided with a second passage means for guiding vaporized refrigerant upwardly through said displacer, and pressure relief valve means communicating with said second passage means for maintaining the latter closed during normal operating conditions, so that the maximum pressure in said container means is limited by said pressure relief valve means.

2. A cryostat comprising container means for containing a refrigerant of low boiling point in a lower portion of said container means up to a given elevation therein, said container means having an inner, substantially cylindrical surface extending upwardly from said given elevation, a displacer body located in said container means and extending down to the region of said given elevation, said displacer body consisting entirely of heat insulating material and having an outer surface peripherally contacting said inner surface of said container means and provided with a helically rising groove to form a passage for channeling vaporized refrigerant upwardly therealong in an amount resulting from normal operating conditions without substantially increasing the pressure in said container, an electrical superconductive structure situated in said lower portion of said container means, and electrical leads connected with said superconductive structure for supplying electricity thereto, said electrical leads being housed within said grooved outer surface of said displacer body.

3. In a cryostat according to claim 2, wherein said electrical leads have cooling fins, said cooling fins supporting said electrical leads in said grooved outer surface.

4. A cryostat comprising container means for containing a refrigerant of low boiling point in a lower portion of said container means up to a given elevation therein, said container means having an annular shape defined by an outer wall having a first inner surface and an inner wall having a second inner surface, said walls being concentrically disposed, said first and second inner surfaces facing each other and extending upwardly from said given elevation, and a displacer body located in said container means and extending down to the region of said given elevation, said displacer body consisting entirely of heat insulating material and having an outer exterior surface and an inner exterior surface, said displacer body surfaces being concentrically disposed, said outer exterior surface and said inner exterior surface being directed toward said first inner surface and said second inner surface respectively, each of said displacer body surfaces having a helically rising groove to form respective passages for channeling vaporized refrigerant upwardly therealong in an amount resulting from normal operating conditions without substantially increasing the pressure in said container.

5. A cryostat comprising container means for containing a refrigerant of low boiling point in a lower portion of said container means up to a given elevation therein, said container means having an inner, substantially cylindrical surface extending upwardly from said given elevation, a displacer body located in said container means and extending down to the region of said given elevation, said displacer body consisting entirely of heat insulating material and having an outer surface peripherally contacting said inner surface of said container means and provided with a helically rising groove to form a passage for channeling vaporized refrigerant upwardly therealong in an amount resulting from normal operating conditions without substantially increasing the pressure in said container, and a heat shield of good thermal conductivity surrounding said container means, said heat shield being attached to said container at the elevation of said displacer body whereby said heat shield is cooled by said vaporized refrigerant.

6. A cryostat comprising container means for containing a refrigerant of low boiling point in a lower portion of said container means up to a given elevation therein, said container means having an inner, substantially cylindrical surface extending upwardly from said given elevation, and a displacer body located in said container means and extending down to the region of said given elevation, said displacer body consisting entirely of heat insulating material and having an outer surface peripherally contacting said inner surface of said container means and provided with a helically rising groove to form a passage for channeling vaporized refrigerant upwardly therealong in an amount resulting from normal operating conditions without substantially increasing the pressure in said container, said container means having an upper end carrying a cover, said displacer body directing the vaporized refrigerant along a path spaced from said cover whereby said cover is not contacted by said vaporized refrigerant.

7. A cryostat comprising container means for containing a refrigerant of low boiling point in a lower portion of said container means up to a given elevation therein, said container means having an inner, substantially cylindrical surface extending upwardly from said given elevation, and a displacer body located in said container means and extending down to the region of said given elevation, said displacer body being formed of heat insulating material and having an outer surface peripherally contacting said inner surface of said container means and provided with a helically rising groove to form a passage for channeling vaporized refrigerant upwardly therealong, said displacer body having a longitudinal axis and comprising a plurality of mutually adjacent body portions having planar surfaces perpendicular to said longitudinal axis, and thin metal sheets disposed in sandwich arrangement between said adjacent body portions respectively.

References Cited
UNITED STATES PATENTS

| | | | |
|---|---|---|---|
| 2,648,953 | 8/1953 | Sulfrian et al. | 62—54 |
| 2,909,908 | 10/1959 | Pastuhov et al. | |
| 3,018,643 | 1/1962 | Evers | 62—514 |
| 3,195,620 | 7/1965 | Steinhardt. | |
| 3,349,161 | 10/1967 | Latham | 62—51 X |

LLOYD L. KING, *Primary Examiner.*

U.S. Cl. X.R.

62—50, 514